United States Patent
Ogawa et al.

(10) Patent No.: US 8,648,557 B2
(45) Date of Patent: Feb. 11, 2014

(54) DRIVE CONTROL SIGNAL GENERATING CIRCUIT

(75) Inventors: Takashi Ogawa, Ogaki (JP); Takahisa Nakai, Ogaki (JP); Tsutomu Murata, Mizuho (JP)

(73) Assignee: ON Semiconductor Trading, Ltd., Hamilton (BM)

( * ) Notice: Subject to any disclaimer, the term of this patent is extended or adjusted under 35 U.S.C. 154(b) by 219 days.

(21) Appl. No.: 13/247,050

(22) Filed: Sep. 28, 2011

(65) Prior Publication Data

US 2012/0081049 A1  Apr. 5, 2012

(30) Foreign Application Priority Data

Sep. 30, 2010  (JP) ................................ 2010-222251

(51) Int. Cl.
*H02K 5/00* (2006.01)

(52) U.S. Cl.
USPC ............ 318/400.13; 318/400.35; 318/400.38; 318/484; 318/285

(58) Field of Classification Search
USPC ........... 318/400.13, 400.35, 400.38, 484, 285
See application file for complete search history.

(56) References Cited

U.S. PATENT DOCUMENTS

| | | | |
|---|---|---|---|
| 6,388,416 B1 * | 5/2002 | Nakatani et al. | 318/700 |
| 6,400,107 B1 * | 6/2002 | Nakatani et al. | 318/400.21 |
| 7,358,698 B2 * | 4/2008 | Seguchi et al. | 318/700 |
| 2010/0188036 A1 * | 7/2010 | Hioki et al. | 318/685 |

FOREIGN PATENT DOCUMENTS

| | | |
|---|---|---|
| JP | 8-037798 A | 2/1996 |
| JP | 2001-352777 A | 12/2001 |
| JP | 2006-288056 A | 10/2006 |

OTHER PUBLICATIONS espacenet, Patent Abstract for Japanese Publication No. 2001-352777 Published Dec. 21, 2001 (1 page).
espacenet, Patent Abstract for Japanese Publication No. 2006-288056 Published Oct. 19, 2006 (1 page).
espacenet, Patent Abstract for Japanese Publication No. 8-37798 Published Feb. 6, 1996 (1 page).

* cited by examiner

*Primary Examiner* — Rita Leykin
(74) *Attorney, Agent, or Firm* — Osha Liang LLP

(57) ABSTRACT

A drive control signal generating circuit that generates a drive control signal for driving a motor includes an output control circuit that includes a flip-flop in which a state changes by a rotational state signal of the motor crossing a reference value and generates a motor drive control signal according to the state of the flip-flop, a clock generating circuit that generates a clock that defines a time of reading data in the flip-flop of the output control circuit; and a PWM conversion circuit that PWM-converts the drive control signal using the clock as a PWM signal. The clock has a frequency in which the output control circuit operates and has a duty ratio of the PWM signal.

4 Claims, 8 Drawing Sheets

DRIVE CONTROL SIGNAL GENERATING CIRCUIT

CROSS-REFERENCE TO RELATED APPLICATIONS

The present application claims priority from Japanese Patent Application No. 2010-222251 filed on Sep. 30, 2010. The entire disclosure of Japanese Patent Application No. 2010-222251 filed on Sep. 30, 2010, including specification, claims, drawings, and abstract, is incorporated herein by reference in its entirety.

BACKGROUND OF INVENTION

1. Technical Field

The present invention relates to a drive control signal generating circuit which generates a drive control signal for driving a motor.

2. Background Art

There exist various motors, and a type of motor in which a permanent magnet is provided on a rotor, and a phase of current supply to a plurality of coils on a side of a stator is controlled to form a rotational magnetic field and to rotate a rotor, is widely in use.

Supply of current to such a permanent magnet motor is generally executed by switching of a plurality of transistors. For example, an H-bridge structure is employed in which a pair of arms, in each of which two transistors are connected in series between a power supply and ground, are provided, and a coil is placed between intermediate points of the two arms. In this structure, an upper side transistor of a first arm and a lower side transistor of a second arm are switched ON so that a current of the first side is supplied to the coil, and an upper side transistor of the second arm and a lower side transistor of the first arm are switched ON so that a current of the second side is supplied to the coil. In this manner, the phase of the current flowing in the coil can be controlled. By providing the coils on different positions of the coil, providing the H-bridge at corresponding positions, and controlling the phase of the current supplied to the coil, it is possible to drive the motor.

Here, there is a desire to minimize the power consumption in an electronic device. In particular, the motor requires a high power at startup, but the power can be reduced after the rotation is stabilized. In order to reduce the power, PWM control is employed. However, for the PWM control, elements such as a comparator for comparing a triangular wave and a threshold value, etc., are required, and the size of the circuit is increased.

SUMMARY OF INVENTION

According to one aspect of the present invention, there is provided a drive control signal generating circuit which generates a drive control signal for driving motor, the drive control signal generating circuit comprising an output control circuit which comprises a flip-flop which reads a cross point of a reference value by a rotational state signal of the motor and which generates a motor drive control signal according to a state of the flip-flop, a clock generating circuit which generates a clock which defines a time of reading data in the flip-flop of the output control circuit, and a PWM conversion circuit which PWM-converts the drive control signal using the clock as a PWM signal, wherein the clock has a frequency at which the output control circuit operates and has a duty ratio of the PWM signal.

According to various aspects of the present invention, because the clock which is used as the reading signal for a flip-flop is used as the PWM signal, it becomes not necessary to provide the comparator or the like for generating the PWM signal.

BRIEF DESCRIPTION OF DRAWINGS

A preferred embodiment of the present invention will be described in further detail based on the following drawings, wherein.

DETAILED DESCRIPTION

Figure 1:
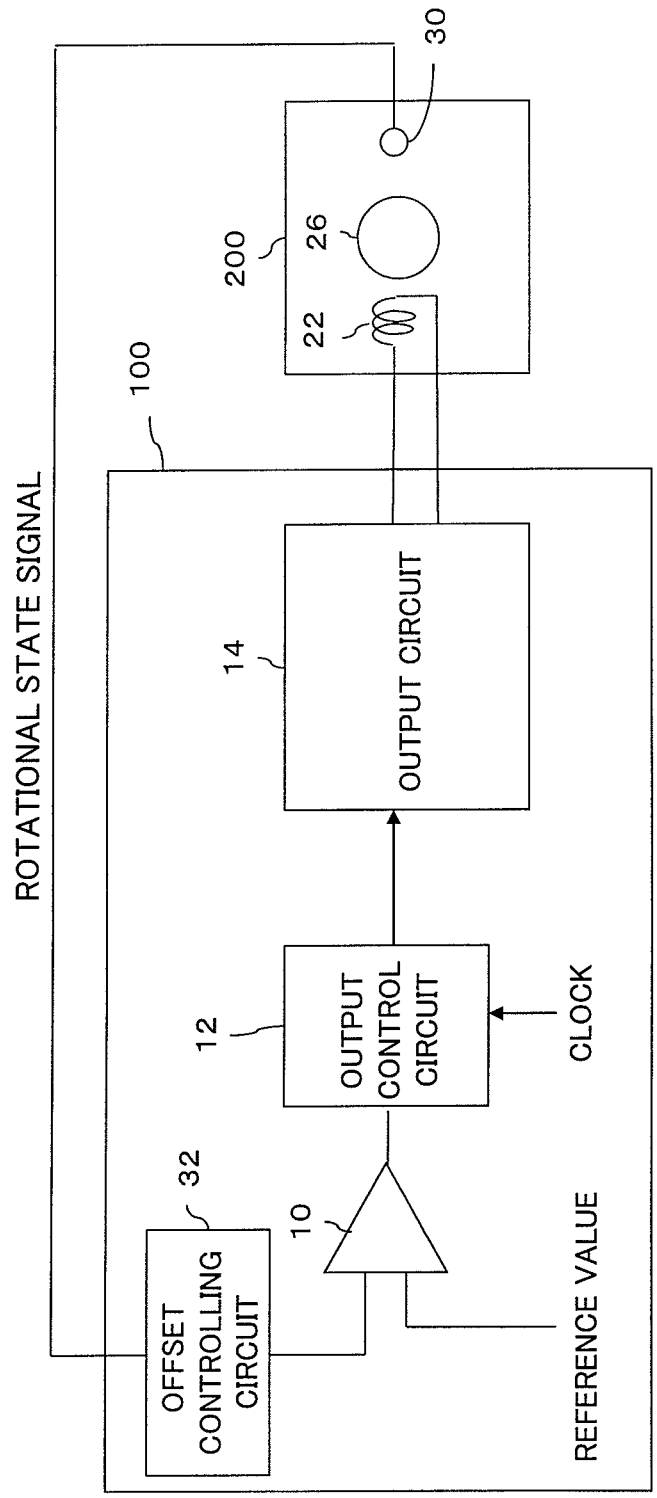
FIG. 1 is a block diagram showing an overall structure.

A preferred embodiment of the present invention will now be described with reference to the drawings. FIG. 1 is a diagram showing an overall structure. A system comprises a driver 100 and a motor 200. An input signal is input to the driver 100, and the driver 100 supplies a drive current corresponding to the input signal to the motor 200. In this manner, rotation of the motor 200 is controlled according to the input signal.

The driver 100 comprises a comparator 10, and a rotational state signal corresponding to a rotor position from a Hall element 30 provided on the motor 200 is supplied through an offset controlling circuit 32 to one terminal of the comparator 10. More specifically, the offset controlling circuit 32 adds a predetermined offset value to the rotational state signal, and an added signal which is alternately shifted in the up-and-down direction is obtained. The added signal is supplied to the one terminal of the comparator 10. A reference value voltage is supplied to the other terminal of the comparator 10, and the comparator 10 detects that the added signal has reached the reference value.

An output of the comparator 10 is supplied to an output control circuit 12. The output control circuit 12 determines a drive waveform (phase) of a predetermined frequency according to the output signal of the comparator 10, and the drive control signals (OUT1, OUT2) are controlled to be PWM-driven, so that the amplitude of the drive current is determined. The generated drive control signal is supplied to an output circuit 14.

The output circuit 14 comprises a plurality of transistors, controls a current from the power supply by switching of the transistors to generate a motor drive current, and supplies the motor drive current to the motor 200.

Figure 2:
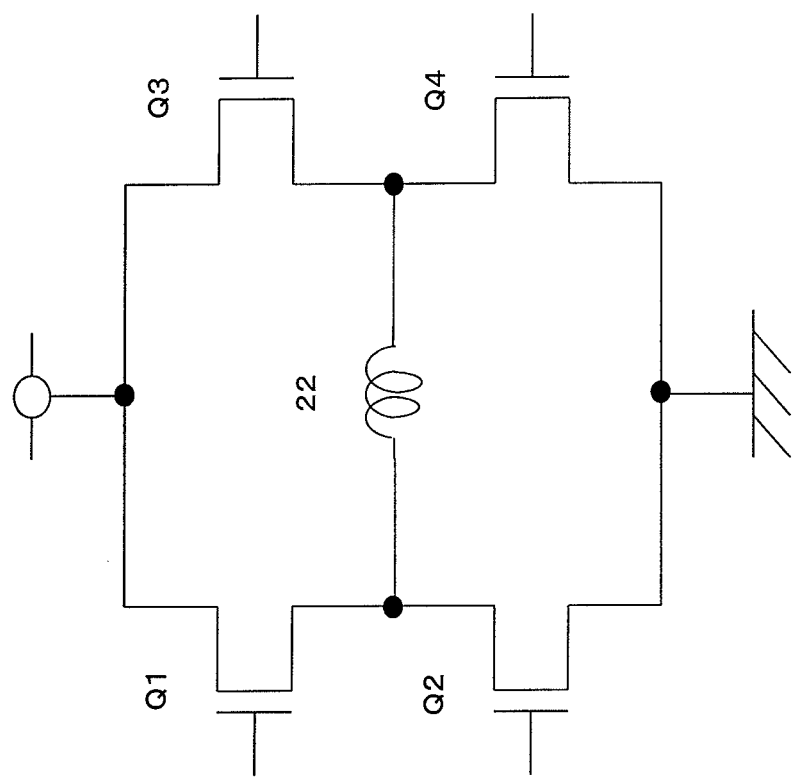
FIG. 2 is a diagram showing an example configuration of an output circuit.

FIG. 2 shows a structure of a part of the output circuit 14 and one coil 22 of the motor 200. As shown in FIG. 2, an arm comprising a series connection of two transistors Q1 and Q2 and an arm comprising a series connection of two transistors Q3 and Q4 are provided between the power supply and the ground, and a coil 22 is connected between an intermediate point of the transistors Q1 and Q2 and an intermediate point of the transistors Q3 and Q4. By switching the transistors Q1 and Q4 ON and the transistors Q2 and Q3 OFF, a current of one direction is supplied to the coil 22, and by switching the transistors Q1 and Q4 OFF and the transistors Q2 and Q3 ON, a current of an opposite direction is supplied to the coil 22. The coil 22 is driven in this manner.

The motor 200 comprises the coil 22 and a rotor 26. In addition, a permanent magnet is provided on the rotor 26, and, for example, an N pole and an S pole are placed on opposed positions (positions different from each other by 180°). A stable position is determined according to a magnetic field from the coil 22.

Therefore, by supplying an alternating current, it is possible to move the rotor 26 by the phase of the current and rotate the rotor 26. In addition, by stopping the change of the phase of the current at a time of a certain phase of current, it is possible to stop the rotor at a position corresponding to the current phase at that point in time. In this manner, the rotation of the motor 200 is controlled.

The Hall element 30 is provided on the motor 200, and the rotational state signal is generated according to the magnetic field from the permanent magnet of the rotor 26. When there are one N pole and one S pole as described above, a sine wave having a period of one rotation of the rotor 26 is obtained as the rotational state signal.

The rotational state signal from the Hall element 30 is supplied to the offset controlling circuit 32. The offset controlling circuit 32 shifts the rotational state signal by a predetermined amount of offset, and sets an interval between two reference cross points (in the example configuration, zero-cross points) to, for example, 150°.

Figure 3:
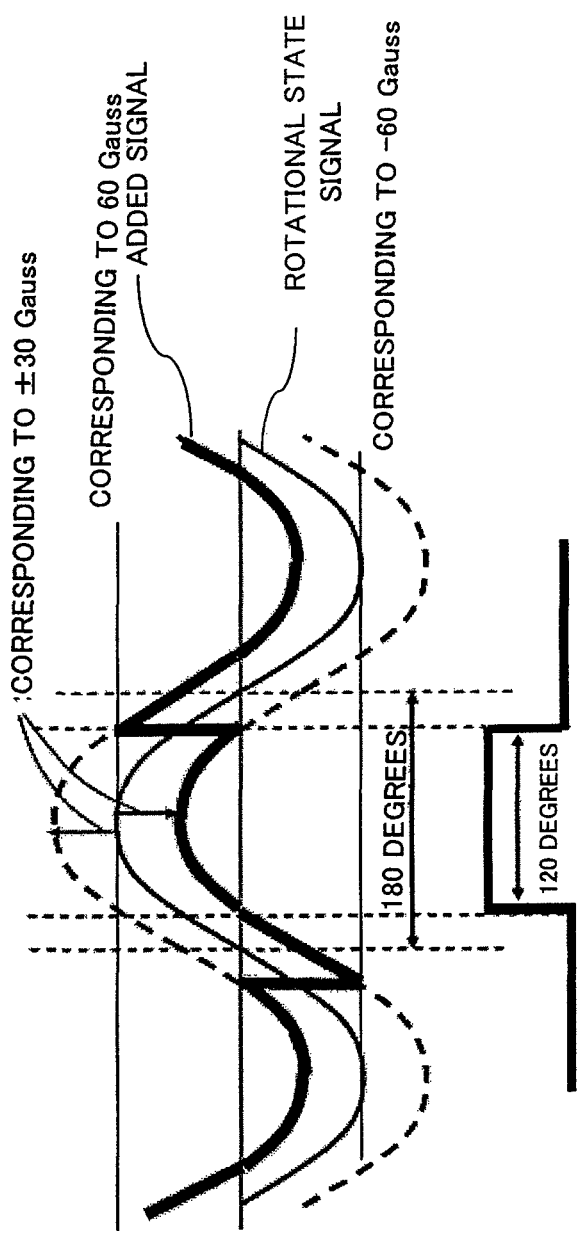
FIG. 3 is a diagram showing an example of an added signal.

FIG. 3 shows an example configuration in which the interval between zero-cross points is changed from 180° to 120°. The rotational state signal is a sine wave of a voltage which corresponds to 0 Gauss at 0°, to +60 Gauss at 90°, to 0 Gauss at 180°, and to −60 Gauss at 270°. Therefore, by setting the rotational state signal closer to zero by a voltage corresponding to 30 Gauss, it is possible to set the interval between two zero-cross points to 120°. Thus, when the added signal to which an amount corresponding to +30 Gauss is added on the negative (−) side (signal in which the rotational state signal is set closer to zero by an amount corresponding to 30 Gauss) reaches zero for the first time (phase of −30° of the rotational state signal), an addition of −30 Gauss (subtraction of 30 Gauss) is employed in place of +30 Gauss. In this manner, the added signal is shifted in the negative (−) direction by an amount corresponding to 60 Gauss. In the case of this example configuration, because the addition of an amount corresponding to −60 Gauss corresponds to a shift corresponding to 60°, the added signal reaches the zero from the negative (−) side for a second time at the phase of the rotational state signal of +30°. In the case of the zero for the second time, the added signal transitions to the positive (+) side with the addition of −30 Gauss unchanged. Then, at the reaching of the zero from the positive (+) side for the first time, the addition is switched to +30 Gauss. In this manner, the amount of offset is switched from +30 Gauss to −30 Gauss at the phase of the rotational state signal of 330°) (−30°, the amount of offset is switched from −30 Gauss to +30 Gauss at the phase of 150°, and these operations are repeated so that a signal of a period of 120° between the zero of the added signal for the second time to the zero for a next time is obtained. In FIG. 3, an example configuration where the interval between the zero-cross points is set to 120° is shown, but by adjusting the amount of offset to be added (in this case, to an amount corresponding to ±15 Gauss), a signal having a period of 150° or the like can be obtained.

Alternatively, a configuration may be employed in which a voltage having the same potential as a common voltage of the Hall element 30 is supplied as the reference to the other terminal of the comparator 10. With such a configuration, the "zero" used in the Hall element 30 and the comparator 10 become equal to each other, and the electricity application period to the coil 22 can be set more accurately.

Figure 4:
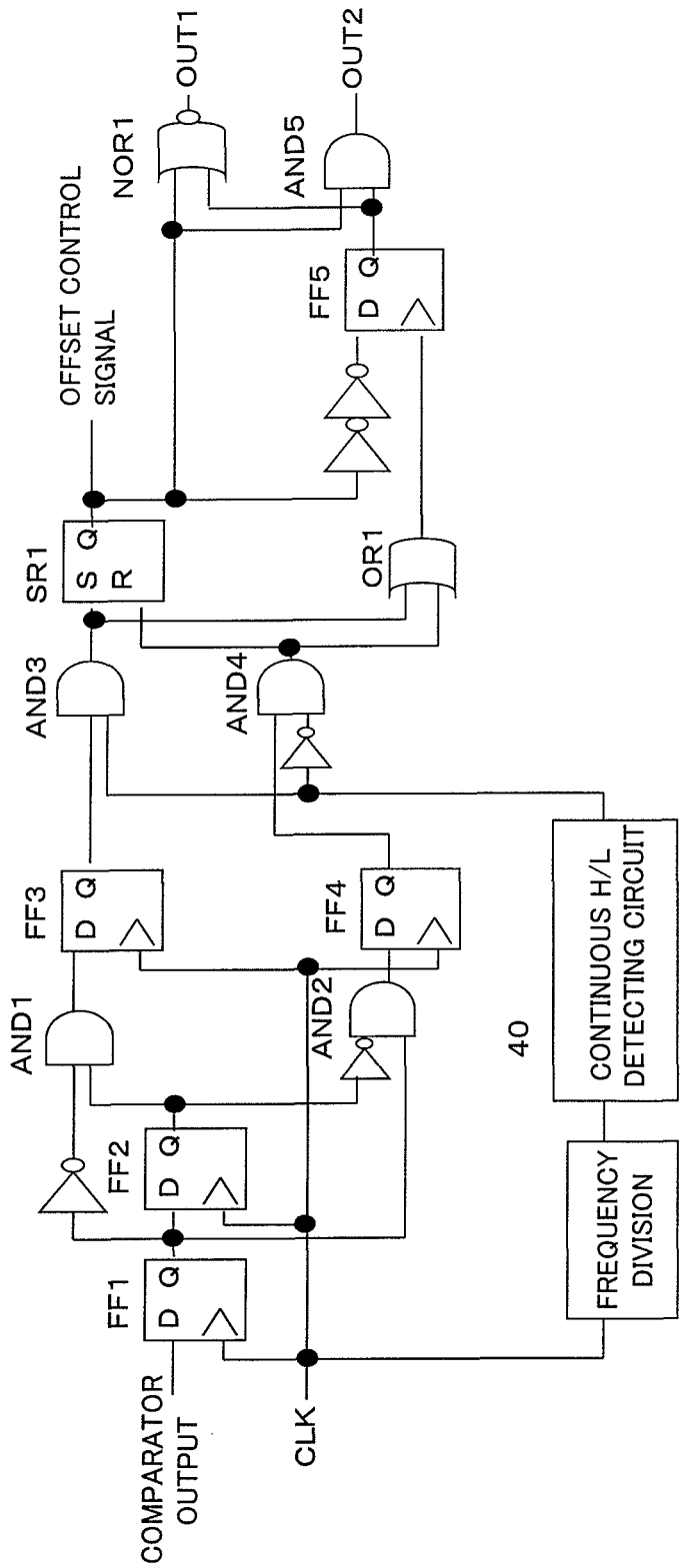
FIG. 4 is a diagram showing an example configuration of an output control circuit.
Figure 5:
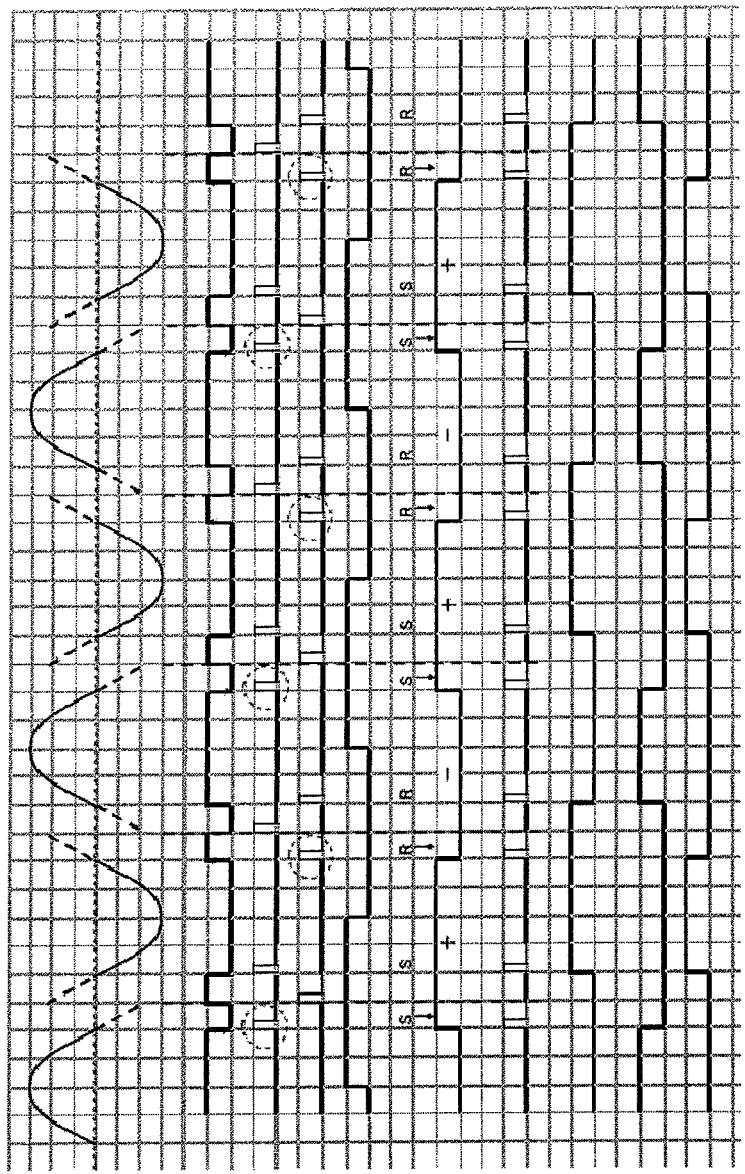
FIG. 5 is a diagram showing a signal waveform of each section of the output control circuit.

FIG. 4 shows an example configuration of the output control circuit 12, which is a structure for applying 150°-electricity application (150°-electricity application generating circuit 50), and FIG. 5 shows a signal waveform of each section. The output control circuit 12 operates at a frequency of a clock CLK generated by a clock generating circuit 50 to be described later. An output of the comparator (comparator raw output) detects a zero-cross point of a signal obtained by sequentially shifting the rotational state signal in a manner described above. The example configuration shows an example of 120°-electricity application, similar to FIG. 3. The read output when the comparator raw output is read by a flip-flop is L level for the rotational state signal of 0° to 30°, H level for the rotational state signal of 30° to 150°, L level for the rotational state signal of 150° to 180°, H level for the rotational state signal of 180° to 210°, L level for the rotational state signal of 210° to 330°, and H level for the rotational state signal of 330° to 360° (FIG. 5(*i*)).

The comparator raw output is supplied to a D input terminal of a flip-flop FF1. A predetermined clock CLK is supplied to a clock input terminal of the flip-flop FF1, and the flip-flop FF1 sequentially holds the output of the comparator 10. Because the clock CLK has a high frequency compared to the change of the output of the comparator 10, the flip-flop FF1 reads the output of the comparator 10 without further processing and with a delay of a predetermined period.

The output of the flip-flop FF1 is supplied to a D input terminal of a flip-flop FF2, and the clock CLK is supplied to a clock input terminal of the flip-flop FF2. Therefore, the output of the flip-flop FF2 is a signal which is delayed by one period of the clock CLK compared to the output of the flip-flop FF1. The output of the flip-flop FF1 is inverted and input to an AND gate AND1, and the output of the flip-flop FF2 is input to the AND gate AND1 without being inverted. Therefore, the output of the AND gate AND1 is a signal which rises for one period of the clock CLK when the output of the comparator 10 falls.

More specifically, as shown by a fall detection signal of FIG. 5(*ii*), a signal which rises for one period of the clock CLK at the fall of the read output is obtained at the output of the AND gate AND1.

In addition, the output of the flip-flop FF1 and an inverted output of the flip-flop FF2 are input to an AND gate AND2. Therefore, as shown by a rise detection signal of FIG. 5(*iii*), a signal which rises for one period of the clock CLK at the rise of the read output is obtained at an output of the AND gate AND2.

In FIG. 5, the fall detection signal (ii) and the rise detection signal (iii) are shown as pulses that are shorter than the clock CLK. This is because a signal having a higher frequency than the clock CLK is used as the clock for fall and rise detection and one clock is set as the detection pulse, but the overall operation is no different.

After a predetermined frequency division is applied to the clock CLK, the clock CLK is input to a continuous H/L detecting unit 40. The continuous H/L detecting unit 40 is set to the H level, for example, when the H level at the read output continues for a period of 60° and to the L level when the L level in the read output continues for a period of 60°. Therefore, in the example configuration, the output of the continuous H/L detecting unit 40 is at the H level for a period of the rotational state signal of 90° to 270° and at the L level for the remaining half period (FIG. 5(*iv*)).

The output of the AND gate AND1 is supplied to a D input terminal of a flip-flop FF3, and the output of the AND gate AND2 is supplied to a D input terminal of a flip-flop FF4. The clock CLK is supplied to clock input terminals of the flip-flops FF3 and FF4. Therefore, the outputs of the AND gates AND1 and AND2 are read to the flip-flops FF3 and FF4. The outputs of the flip-flops FF3 and FF4 are input to AND gates AND3 and AND4, respectively. The continuous H/L detection signal is input to the other input terminal of the AND gate AND3, and an inverted signal of the continuous H/L detection signal is input to the other input terminal of the AND gate AND4. Therefore, in the output of the AND gate AND3, a pulse corresponding to the rotational state signal of 0° in the fall detection signal is removed, and only pulses of 150° and 210° remain. Similarly, in the output of the AND gate AND4, a pulse corresponding to the rotational state signal of 180° in the rise detection signal is removed, and only pulses of 30° and 330° remain.

The output of the AND gate AND3 is supplied to a set input terminal of an SR latch circuit SR1, and the output of the AND gate AND4 is supplied to a reset input terminal of the SR latch circuit SR1 (FIG. 5(*v*)). Therefore, as shown in FIG. 5(*vi*), an offset control signal which becomes the H level at the rotational state signal of 330° and which becomes the L level at the rotational state signal of 150° is obtained at an output of the SR latch SR1. The output of the SR latch SR1 is supplied to the offset controlling circuit 32, and is used for switching control to add a predetermined offset value (corresponding to 30 Gauss) to the rotational state signal when the output is at the H level and to subtract a predetermined offset value (corresponding to 30 Gauss) from the rotational state signal when the output is at the L level.

The outputs of the AND gates AND3 and AND4 are input to an OR gate OR1. A double-edge signal having four pulses at 330°, 30°, 150°, and 210° is obtained at an output of the OR gate OR1 (FIG. 5(*vii*)). The offset control signal is delayed by a predetermined amount, and then supplied to a D input terminal of a flip-flop FF5. The double-edge signal from the OR gate OR1 is supplied to a clock input terminal of the flip-flop FF5, and a signal which becomes the H level at the rotational state signal of 30° and which becomes the L level at the rotational state signal of 210° is obtained at an output of the flip-flop FF5 (FIG. 5(*viii*)).

The output of the flip-flop FF5 is input to a NOR gate NOR1 and an AND gate AND5, and the output of the SR latch SR1 is supplied to the other input terminals of the NOR gate NOR1 and the AND gate AND5. Thus, a drive control signal OUT1 which becomes the H level only for a period from 30° to 150° is obtained at an output of the NOR gate NOR1 (FIG. 5(*ix*)), and a drive control signal OUT2 which becomes the H level only for a period from 210° to 330° is obtained at an output of the AND gate AND5 (FIG. 5(*x*)).

The drive control signals OUT1 and OUT2 are supplied to the output circuit 14 to control the ON/OFF switching of the transistors Q1 and Q4 and the transistors Q3 and Q2 as in FIG. 2, so that the drive current control of the coil 22 as described above is executed.

In FIG. 1, because the Hall element 30 is placed at a position opposing the coil 22, a rotational state signal which is synchronized with the coil 22 is obtained, but the position of placement of the Hall element 30 is not necessarily limited. In addition, as described above, the amount of offset to be added to or subtracted from the rotational state signal can be adjusted, to easily realize 150°-electricity application or the like.

The 150°-electricity application has a lower power for rotating the rotor compared to the 180°-electricity application. However, there exists an electricity application stopping period, and there may be cases where the rotation of the rotor is not started and the rotational state signal cannot be obtained. Thus, it is preferable to have the 180°-electricity application at the time of starting the operation. On the other hand, after the rotational state is stabilized, it is preferable to further reduce the power to achieve reduction of power consumption. Therefore, in the present embodiment, PWM conversion is applied to the drive control signal, to achieve reduction of power consumption.

Figure 6:
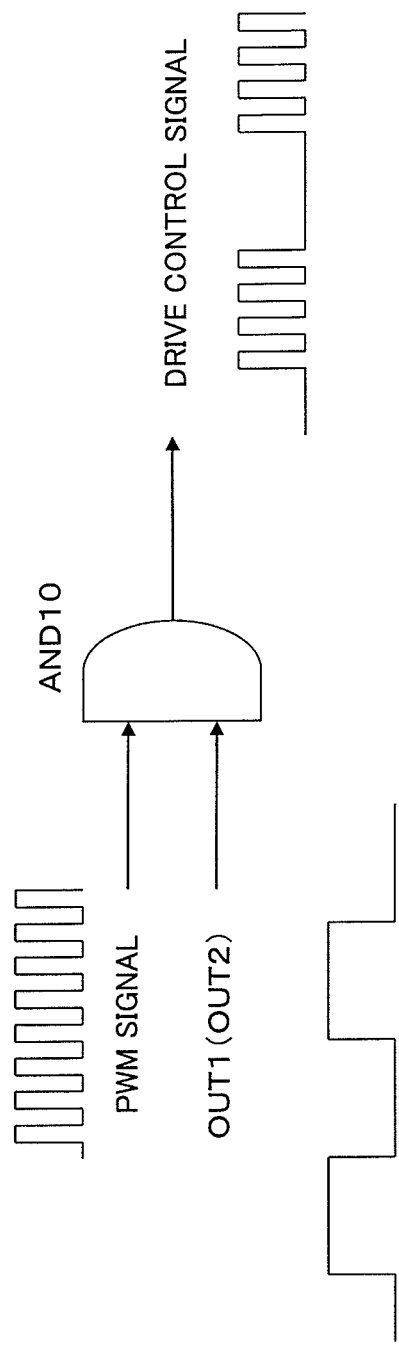
FIG. 6 is a diagram showing a structure for generating a drive control signal from a PWM signal.

FIG. 6 shows an example structure of the PWM conversion of the drive control signal. As shown, with an AND gate AND10, a logical product (AND) of the drive control signal OUT1 (or OUT2) and a PWM signal of a predetermined duty ratio can be determined, to obtain a PWM-converted drive control signal. For such a PWM conversion, it is necessary to generate a PWM signal of a predetermined duty ratio. Normally, the PWM signal is generated by a comparing a triangular wave of a PWM carrier frequency and a threshold voltage signal which determines a duty ratio. Therefore, for generation of the PWM signal, a circuit such as a comparator is normally required.

In the present embodiment, in the clock generating circuit which generates the clock CLK in FIG. 4, a clock of an arbitrary duty ratio is generated, and is used not only as the clock CLK, but also as the PWM signal for generating the drive control signal.

Figure 7:
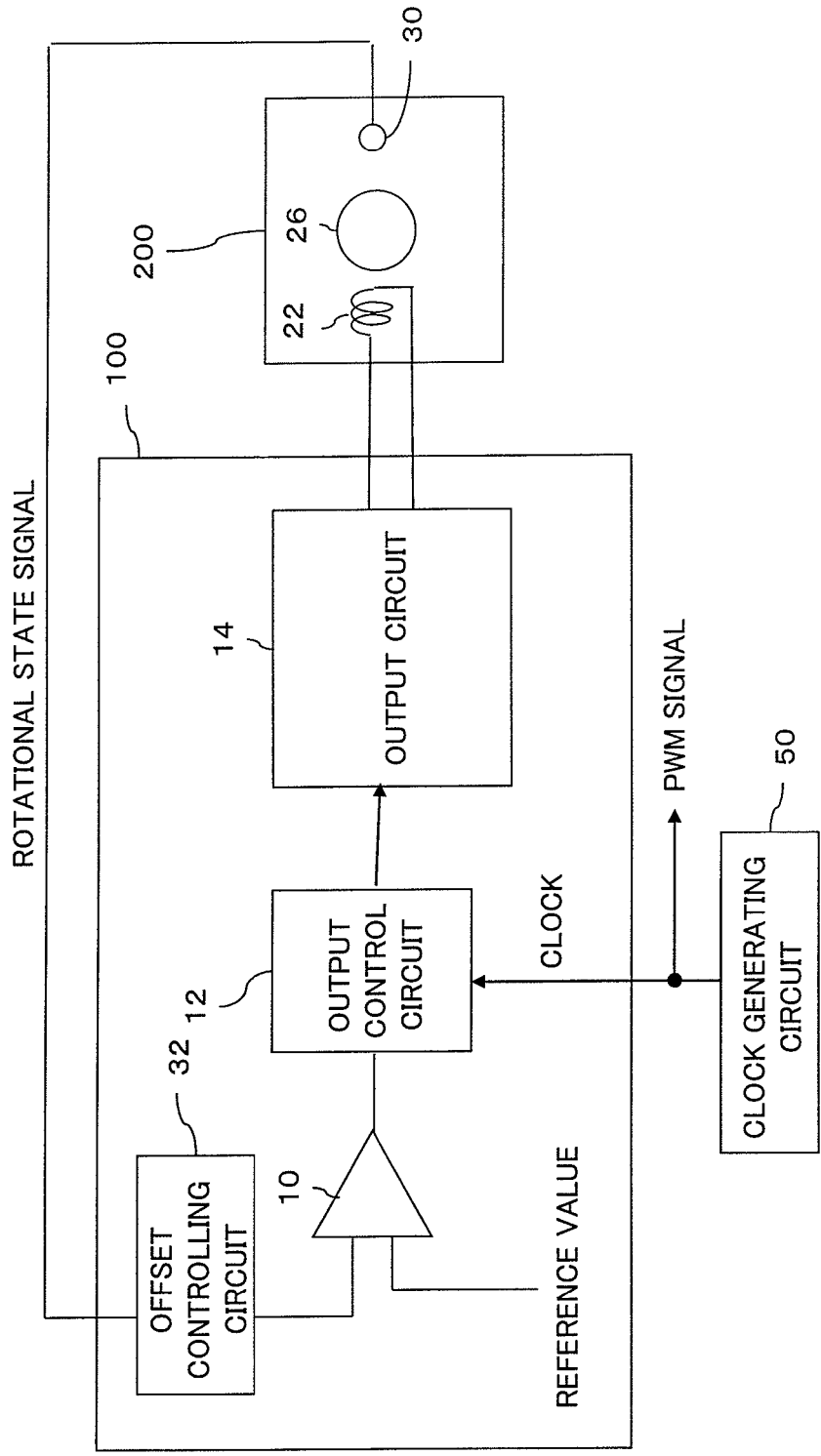
FIG. 7 is a block diagram showing an overall structure.

More specifically, as shown in FIG. 7, the clock which is output from the clock generating circuit 50 is supplied to the output control circuit 12 as the clock CLK, and at the same time, the clock is output as the PWM signal.

Figure 8:
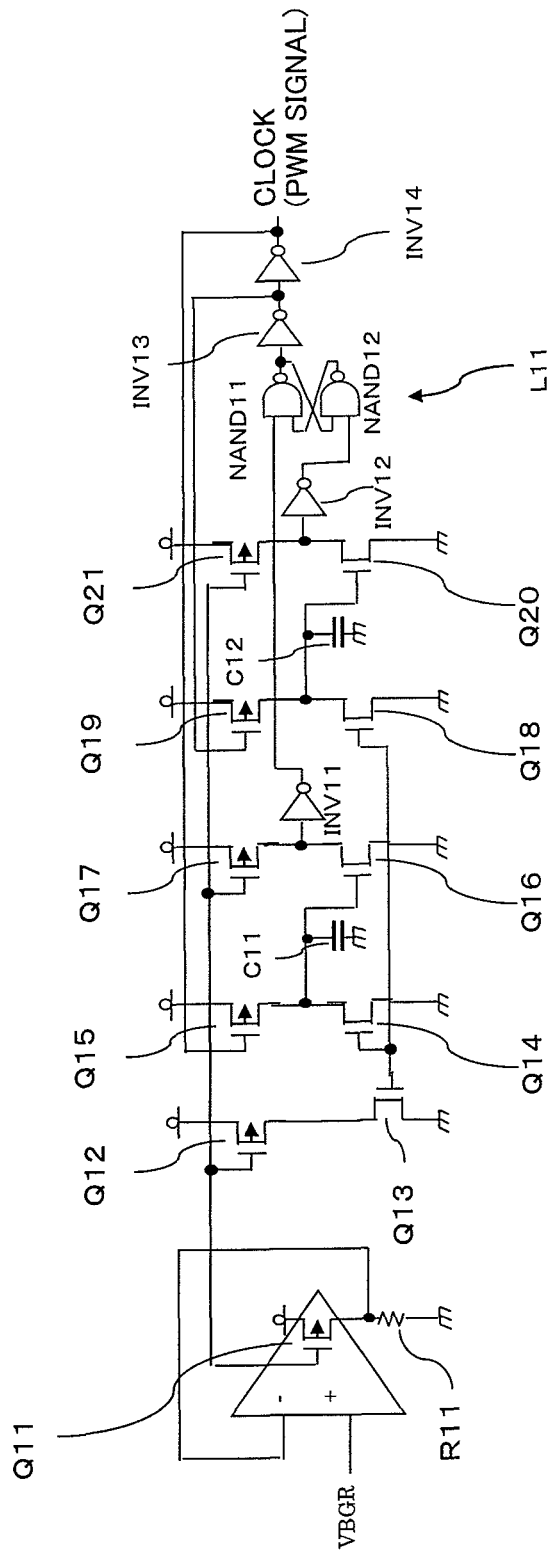
FIG. 8 is a diagram showing a structure of a clock generating circuit.

FIG. 8 shows a structure of the clock generating circuit 50. A reference voltage VBGR is supplied to a positive input terminal of an operational amplifier OP11. The operational amplifier OP11 has a p-channel output transistor Q11 having a source connected to the power supply, and a drain of the output transistor Q11 is set as an output terminal. The output terminal of the operational amplifier OP11 is connected to ground through a resistor R11 and is also connected to a negative input terminal. Therefore, the output terminal of the operational amplifier OP11 is controlled by the voltage VBGR of the positive input terminal, and a current corresponding to this voltage flows to the resistor R11 and the transistor Q11.

On a gate of the output transistor Q11, a gate of a p-channel transistor Q12 having a source connected to the power supply is connected, and on a drain of the transistor Q12, a drain of an n-channel transistor Q13 having a source connected to the ground is connected. Therefore, a current corresponding to the current flowing in the output transistor Q11 flows in the transistors Q12 and Q13.

A gate of an n-channel transistor Q14 having a source connected to ground is connected to a gate of the transistor Q13. A drain of the transistor Q14 is connected to a drain of a p-channel transistor Q15 having a source connected to the power supply. In addition, a connection point of the transistor Q14 and the transistor Q15 is connected to a gate of an n-channel transistor Q16 having a source connected to ground, and a capacitor C11 having a second end connected to ground is connected to a gate of the transistor Q16.

When the transistor Q15 is in the ON state, the transistor Q14 supplies a current corresponding to the current flowing in the transistor Q13. On the other hand, the transistor Q15 is set such that when the transistor Q15 is switched ON, the transistor Q15 supplies a current higher than the current supplied by the transistor Q14. Therefore, when the transistor Q15 is switched ON, the capacitor C11 is charged, and when the transistor Q15 is switched OFF, the capacitor C11 is discharged.

A drain of a p-channel transistor Q17 having a source connected to the power supply is connected to a drain of the transistor Q16, and a connection point of the transistor Q16 and the transistor Q17 is connected to a set input terminal of a latch circuit L11 through an inverter INV11.

Therefore, when the transistor Q15 is in the ON state, the capacitor C11 is charged, and when the charged voltage of the capacitor C11 exceeds the threshold voltage of the transistor Q16, the transistor Q16 is switched ON. On the other hand, when the transistor Q15 is in the OFF state, the capacitor C11 is discharged by a current flowing in the transistor 14, and when the charged voltage of the capacitor C11 becomes lower than the threshold voltage of the transistor Q16, the transistor Q16 is switched OFF.

The gate of the transistor Q13 is also connected to a gate of an n-channel transistor Q18 having a source connected to ground. A drain of the transistor Q18 is connected to a drain of a p-channel transistor Q19 having a source connected to the power supply, and a connection point of the transistor Q18 and the transistor Q19 is connected to a gate of an n-channel transistor Q20 having a source connected to ground, and a capacitor C12 having a second end connected to ground is connected to a gate of the transistor Q20.

The transistor Q19 is set such that the transistor Q19 supplies a current higher than the transistor Q18 when the transistor Q19 is switched ON. Thus, when the transistor Q19 is switched ON, the capacitor C12 is charged, and when the transistor Q19 is switched OFF, the capacitor C12 is discharged.

A drain of a p-channel transistor Q21 having a source connected to the power supply is connected to a drain of the transistor Q20, and a connection point of the transistor Q20 and the transistor Q21 is input to a reset input terminal of the latch circuit L11 through an inverter INV12.

Therefore, when the transistor Q19 is switched ON, the capacitor C12 is charged, and when the charged voltage of the capacitor C12 exceeds the threshold voltage of the transistor Q20, the transistor Q20 is switched ON. When the transistor Q19 is switched OFF, the capacitor C12 is discharged by the current flowing in the transistor Q18, and when the charged voltage of the capacitor C12 becomes less than the threshold voltage of the transistor Q20, the transistor Q20 is switched OFF.

The connection point of the transistor Q17 and the transistor Q16 is connected to the reset input of the latch circuit L11 through the inverter INV11, and the connection point of the transistor Q19 and the transistor Q18 is connected to the set input of the latch circuit L11 through the inverter INV12.

The latch circuit L11 comprises a circuit in which two NAND gates are crosswise connected, and the output is set to the H level by a set input and the output is set to the L level by a reset input of H level. More specifically, the latch circuit L11 comprises two NAND gates NAND11 and NAND12, an output of the NAND gate NAND11 is input to the NAND gate NAND12, and an output of the NAND gate NAND12 is input to the NAND gate NAND11. An output of the inverter INV11 is input to the NAND gate NAND11, an output of the inverter INV12 is input to the NAND gate NAND12, and an output of the NAND gate NAND11 is set as the output of the latch circuit L11. Therefore, with a rise of the output of the inverter INV11, the L level is latched in the latch circuit L11, and with a rise of the inverter INV12, the H level is latched in the latch circuit L11.

The output of the latch circuit L11 is output as a clock through two inverters INV13 and INV14.

An output of the inverter INV13 is supplied to the gate of the transistor Q19, and an output of the inverter INV14 is supplied to the gate of the transistor Q15. Therefore, when the clock becomes the H level, the transistor Q15 is switched ON and the capacitor C11 is charged, and after a predetermined time has elapsed and the transistor Q16 is switched ON, the latch L11 is reset, and the output is set to the L level. When the clock is set to the L level, the transistor Q19 is switched ON and the capacitor C12 is charged, and after a predetermined time has elapsed and the transistor Q20 is switched ON, the latch L11 is set, and the output is set to the L level. These processes are repeated.

The frequency of the clock is determined by the capacitances of the capacitors C11 and C12 and sizes of the charging currents to the capacitors C11 and C12. In addition, the charging currents to the capacitors C11 and C12 are identical to each other, and a duty ratio of the clock is set by a capacitance ratio between the capacitors C11 and C12.

In the present embodiment, the capacitance ratio of the capacitor C11 and the capacitor C12 is set to 11:4. Therefore, the time when the capacitor C11 is charged is longer, and a clock having a duty ratio of about 70% and having a longer L level period than the H level period is obtained.

Therefore, this clock can be used as the PWM signal. In particular, in the circuit of FIG. 4, only the timing of rise of the clock CLK is used. Therefore, so long as the rise can be detected, the duty ratio may be an arbitrary ratio such as 99% or 1%. Therefore, by generating the clock having a duty ratio necessary as the PWM signal at the clock generating circuit of FIG. 6, it is possible to not separately generate the PWM signal. Alternatively, the circuit of FIG. 4 may be formed in a structure such that the circuit operates using only the timing of fall of the clock CLK.

Because the duty ratio of the PWM signal depends on the capacitance ratio of the capacitors C11 and C12, it is possible to employ a variable capacitor for one or both of the capacitors C11 and C12, to arbitrarily control the duty ratio of the PWM signal. In addition, the charging periods of the capacitors C11 and C12 can be controlled by controlling the charging currents. Therefore, it is possible to change the amount of current by employing different sizes for the transistors Q15 and Q19. Moreover, it is also possible to provide a plurality of transistors and control ON/OFF switching of the plurality of transistors, to control the charging currents.

In the above description, the output clock of the clock generating circuit 50 is used in the output control circuit 12 which generates the 150°-electricity application signal, but the circuit which uses the clock is not limited to such a circuit. For example, the output of the flip-flop FF1 in FIG. 4 has a rectangular wave shape of 180°, and the drive control signals OUT1 and OUT2 may be generated by this signal and an inverted signal of this signal. Therefore, the output control circuit 12 may be formed as a circuit having one flip-flop, and the clock generating circuit 50 of FIG. 8 may be used as a circuit for generating the clock for the flip-flop.

What is claimed is:
1. A drive control signal generating circuit that generates a drive control signal for driving a motor, the drive control signal generating circuit comprising:
an output control circuit that comprises a flip-flop in which
a state changes by a rotational state signal of the motor crossing a reference value and generates a motor drive control signal according to the state of the flip-flop;

a clock generating circuit that generates a clock that defines a time of reading data in the flip-flop of the output control circuit; and a PWM conversion circuit that PWM-converts the drive control signal using the clock as a PWM signal, wherein the clock has a frequency in which the output control circuit operates and has a duty ratio of the PWM signal, the clock generating circuit comprises:

a unit that generates a period of an H level of the clock by charging a first capacitor; and a unit that generates a period of an L level of the clock by charging a second capacitor, and the duty ratio of the clock is set by setting a capacitance ratio between the first and second capacitors.

2. The drive control signal generating circuit according to claim 1, wherein the output control circuit generates a drive control signal of a rectangular waveform with an electricity application period of less than 180°.

3. The drive control signal generating circuit according to claim 1, wherein the output control circuit generates a drive control signal of a rectangular waveform with an electricity application period of less than 180°.

4. The drive control signal generating circuit according to claim 1, wherein the output control circuit operates using one of a time of a rise or a time of a fall of the clock.

\* \* \* \* \*